(12) United States Patent
Classen et al.

(10) Patent No.: US 7,676,954 B2
(45) Date of Patent: Mar. 16, 2010

(54) DRYING METHOD FOR A HOUSEHOLD APPLIANCE AND HOUSEHOLD APPLIANCE FOR CARRYING THE DRYING METHOD

(75) Inventors: Egbert Classen, Wertingen (DE); Michael Rosenbauer, Reimlingen (DE); Wolfgang Steck, Giengen (DE); Martin Stickel, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 28 days.

(21) Appl. No.: 11/662,582

(22) PCT Filed: Aug. 23, 2005

(86) PCT No.: PCT/EP2005/054133
§ 371 (c)(1),
(2), (4) Date: Aug. 20, 2007

(87) PCT Pub. No.: WO2006/029953
PCT Pub. Date: Mar. 23, 2006

(65) Prior Publication Data
US 2008/0006308 A1    Jan. 10, 2008

(30) Foreign Application Priority Data
Sep. 13, 2004   (DE) .................. 10 2004 044 176

(51) Int. Cl.
*F26B 11/00* (2006.01)
(52) U.S. Cl. .................. 34/486; 34/596; 68/5 C
(58) Field of Classification Search .............. 34/486, 34/596; 68/5 C, 20
See application file for complete search history.

(56) References Cited

U.S. PATENT DOCUMENTS

| | | | | |
|---|---|---|---|---|
| 2,057,277 A | * | 10/1936 | Parsons | 68/232 |
| 2,276,589 A | * | 3/1942 | Peltier et al. | 34/136 |
| 2,512,903 A | * | 6/1950 | Gustav | 432/108 |
| 2,676,418 A | * | 4/1954 | Shewmon | 34/77 |

(Continued)

FOREIGN PATENT DOCUMENTS

DE    6926182 U    12/1969

(Continued)

OTHER PUBLICATIONS

International Search Report PCT/EP2005/054133, filed Feb. 2006.

*Primary Examiner*—Stephen M. Gravini
(74) *Attorney, Agent, or Firm*—James E. Howard; Andre Pallapies

(57) ABSTRACT

A drying method for a household appliance such as a dishwasher comprises a Peltier-element in addition to a heat-emitting part and also a heat-absorbing part for drying the washed items in the treatment area of the dishwasher. The heater-absorbing part cools a lateral wall of the washing container, which guides condensation of humidity into the air of the treatment area. Also, the air of the treatment area is circulated about an air channel by a blower and the air in the air channel is simultaneously heated with the aid of the heat-emitting part of the Peltier-element. The relative humidity of the air is reduced and the capacity of the air of the absorbing humidity is increased.

18 Claims, 2 Drawing Sheets

U.S. PATENT DOCUMENTS

| | | | |
|---|---|---|---|
| 2,932,753 A * | 4/1960 | Arnott et al. | 313/42 |
| 3,036,383 A * | 5/1962 | Edwards | 34/76 |
| 3,264,746 A * | 8/1966 | Pearse | 34/294 |
| 3,712,072 A * | 1/1973 | Hoge et al. | 433/25 |
| 4,464,906 A * | 8/1984 | Outlaw | 62/93 |
| 4,766,462 A * | 8/1988 | Dyer et al. | 399/250 |
| 4,777,970 A * | 10/1988 | Kusuhara | 134/66 |
| 4,959,976 A * | 10/1990 | Matsuda et al. | 62/271 |
| 5,022,167 A * | 6/1991 | Nakamura | 34/655 |
| 5,119,640 A * | 6/1992 | Conrad | 62/272 |
| 5,280,679 A * | 1/1994 | Edelman | 34/66 |
| 5,507,103 A * | 4/1996 | Merritt | 34/97 |
| 5,605,189 A * | 2/1997 | Schlickhoff | 165/263 |
| 5,724,750 A * | 3/1998 | Burress | 34/267 |
| 5,731,157 A * | 3/1998 | Miller et al. | 435/7.4 |
| 5,943,880 A * | 8/1999 | Tateyama | 62/434 |
| 5,974,685 A * | 11/1999 | Hironaka | 34/202 |
| 6,029,371 A * | 2/2000 | Kamikawa et al. | 34/516 |
| 6,047,151 A * | 4/2000 | Carvalho et al. | 399/250 |
| 6,148,536 A * | 11/2000 | Iijima | 34/92 |
| 6,375,742 B2 * | 4/2002 | Sano et al. | 118/600 |
| 6,381,873 B1 * | 5/2002 | Peremychtchev et al. | 34/497 |
| 6,589,359 B2 * | 7/2003 | Kamikawa et al. | 134/26 |
| 6,595,008 B2 * | 7/2003 | Scheibe et al. | 62/62 |
| 6,799,587 B2 * | 10/2004 | Marshall et al. | 134/60 |
| 6,877,248 B1 * | 4/2005 | Cross et al. | 34/275 |
| 6,908,512 B2 * | 6/2005 | Ivanov et al. | 118/503 |
| 6,966,949 B2 * | 11/2005 | Kobayashi et al. | 118/663 |
| 7,066,412 B2 * | 6/2006 | Conley et al. | 239/690 |
| 7,222,439 B2 * | 5/2007 | Paintner | 34/73 |
| 7,225,819 B2 * | 6/2007 | Jackson | 134/200 |
| 7,347,006 B2 * | 3/2008 | Moriya et al. | 34/403 |
| 7,350,317 B2 * | 4/2008 | Matsui et al. | 34/96 |
| 7,513,132 B2 * | 4/2009 | Wright et al. | 68/18 F |
| 7,526,878 B2 * | 5/2009 | Sonobe et al. | 34/266 |
| 7,526,879 B2 * | 5/2009 | Bae et al. | 34/596 |
| 2001/0025431 A1 * | 10/2001 | Kitano et al. | 34/406 |
| 2004/0123489 A1 * | 7/2004 | Pancheri et al. | 34/597 |
| 2004/0123490 A1 * | 7/2004 | Pancheri et al. | 34/597 |
| 2005/0155393 A1 * | 7/2005 | Wright et al. | 68/5 R |
| 2006/0005420 A1 * | 1/2006 | Deguchi et al. | 34/304 |
| 2006/0053652 A1 * | 3/2006 | Gyory et al. | 34/284 |
| 2006/0064892 A1 * | 3/2006 | Matsui et al. | 34/96 |
| 2006/0137214 A1 * | 6/2006 | Achenbach | 34/468 |
| 2006/0168840 A1 * | 8/2006 | Paintner | 34/131 |
| 2007/0000068 A1 * | 1/2007 | Gerard France et al. | 8/158 |
| 2007/0101602 A1 * | 5/2007 | Bae et al. | 34/77 |
| 2008/0000101 A1 * | 1/2008 | Ishikawa et al. | 34/573 |
| 2008/0115384 A1 * | 5/2008 | Krizek et al. | 34/510 |
| 2008/0206455 A1 * | 8/2008 | Sonobe et al. | 427/162 |
| 2008/0229606 A1 * | 9/2008 | Hirai et al. | 34/97 |
| 2008/0236208 A1 * | 10/2008 | Miyata et al. | 68/5 C |
| 2009/0044576 A1 * | 2/2009 | Moschutz | 68/5 C |
| 2009/0158613 A1 * | 6/2009 | Aihara | 34/341 |
| 2009/0165330 A1 * | 7/2009 | Krausch | 34/480 |

FOREIGN PATENT DOCUMENTS

| | | |
|---|---|---|
| DE | 30 21 746 | 12/1981 |
| DE | 198 13 924 | 9/1999 |
| DE | 201 01 641 U | 6/2002 |
| GB | 2 094 961 | 9/1982 |
| JP | 7-265138 | 10/1995 |

* cited by examiner

DRYING METHOD FOR A HOUSEHOLD APPLIANCE AND HOUSEHOLD APPLIANCE FOR CARRYING THE DRYING METHOD

The invention relates to a drying method for a household appliance, in particular a dishwasher or a washer drier or a laundry drier, for drying items to be treated in a treatment chamber filled with a gas, in particular air, wherein a heat-absorbing part of a Peltier element extracts thermal energy from the gas of the treatment chamber for condensation of moisture in the gas. The invention additionally relates to a household appliance for carrying out the drying method, in particular a dishwasher or washer drier or laundry drier, comprising a treatment chamber filled with gas, in particular air, formed by a container, in particular a washing container for the items to be treated, in particular crockery, and a Peltier element having a heat-absorbing part and a heat-emitting part, the heat-absorbing part being arranged in the household appliance in such a manner that thermal energy is removed from the gas of the treatment chamber.

BACKGROUND OF THE INVENTION

In household appliances it is generally necessary to dry the items to be treated. This is the case, for example, with washer driers and laundry driers as well as in particular in dishwashers. It is known that a dishwasher has a washing process whose program sequence normally consists of at least one pre-rinse partial program step, one clean partial program step, at least one intermediate rinse partial program step, a clear rinse partial program step and a drying partial program step. To enhance the cleaning effect, the washing liquid is heated before or during a partial program step. The washing liquid is usually heated by means of an electrical heater. Various drying systems are known for drying washed items, i.e. crockery, in a dishwasher.

In a dishwasher, for example, the crockery or washed items can be dried by own-heat drying if the washing liquid is heated in a partial program step clear rinse and thus the washed items which have undergone a hot clear rinse are dried by themselves by the self-heat of said washed items which has thus built up during the following drying partial program step. In order to achieve this own-heat drying, the washing liquid is heated to a certain temperature in the clear rinse partial program step and applied to the washed items by means of spraying devices. As a result of the relatively high temperature, usually 65-75° C., of the washing liquid in the clear rinse partial program step, it is achieved that a sufficiently large quantity of heat is transferred to the washed items so that water adhering to said washed items vaporises as a result of the heat stored in said washed items. A disadvantage however is that the strong heating both of the washing liquid and also the washed items to high temperatures requires a very large amount of energy.

A method for operating a dishwasher is known from DE 30 21 746 A1 of the applicant, wherein a heat exchanger connected to the washing container in a heat-conducting manner is supplied with cold fresh water during a drying partial program step. A condensing surface is thereby produced on the inside of the washing container on which moisture condenses and the condensation formed remains in the washing container. Since the temperature difference between the moist air and the fresh water which is poured in, is relatively small, and the quantity of fresh water is heated continuously, this results in the disadvantage that the condensation of the moist air lasts for a long time and continually becomes smaller. In addition, strong heating of the washed items and the washing liquid is required in a partial program step preceding the drying partial program step, in particular clear rinsing, which means a high energy expenditure.

In another drying method for dishwashers, the air saturated with water is circulated by a blower and heated by a heater. This takes place in particular in a channel in which the blower and an electrical resistance heater are arranged. Saturated air is sucked out from the washing container via an outlet and is blown into the washing container again via an inlet after heating. As a result of this strong heating of the air, this air can thus absorb more moisture from the air again, i.e. thereby dry the crockery. One possible means for condensation of the moisture in the air is disadvantageously only possible to a limited extent in this drying system. One possibility for condensation only exists at the walls of the washing container which are possibly in thermal contact with the ambient air. However, the walls of the washing container are likewise heated so that only a small temperature difference and therefore a low condensation capacity is provided. In addition, a heat exchanger can also be provided in this drying system with a blower on the washing container in order to slightly improve the condensation performance and thereby the drying result.

Dishwashers are also known in which the air enriched with moisture is blown outwards. This has the disadvantage that pieces of furniture, i.e. kitchen furniture, can be damaged by the escaping moisture. Dishwashers are also known which guide the moist air over condensing surfaces on which the moisture condenses before this moist air is released to the surroundings. This can minimise the risk of damage to items of furniture because a smaller amount of moisture from the dishwasher is released to the surroundings.

A condensing device for a household appliance and a method for operating the same is known from DE 198 13 924 A1. A Peltier element has a heat-emitting surface and a heat-absorbing surface. A heat-absorbing surface extracts heat from working chamber atmosphere of a working chamber of the household appliance with the result that moisture from the atmosphere of the working chamber condenses at the cooled location. In a dishwasher, the heat-absorbing surface is located either inside the washing container or outside the washing container on the outside of the washing container wall and is coupled thermally to said wall in order to absorb the thermal energy from the washing container by means of heat conduction through the washing container wall. The heat-emitting surface releases the heat to the ambient air or to a heat-absorbing volume, e.g. water. A filling body as well as additionally a fan can be arranged on the heat-emitting surface to increase the heat release to the ambient air. In addition, in a further embodiment, the heat-absorbing volume can also be flowing water which can be taken continuously from the fresh water supply. Thus, a disadvantage with this condensing device for a household appliance and the method for operating the same is that merely the heat-absorbing surface of the Peltier element is used to condense the water contained in the gas or vapour phase in the washing container atmosphere. The heat-emitting surface of the Peltier element can thus disadvantageously not be used to improve the drying performance in the washing container atmosphere.

SUMMARY OF THE INVENTION

It is thus the object of the present invention to provide a drying method for household appliances and a household appliance whereby the items to be treated in the household appliance can be dried efficiently in a short time with a low energy input.

This object is achieved by the drying method for household appliances according to the invention according to claim 1 and the household appliance according to the invention according to claim 8. Advantageous further developments of the invention are characterised in the dependent claims.

In a drying method according to the invention for a household appliance, in particular a dishwasher or a washer drier or laundry drier, for drying items to be treated in a treatment chamber filled with gas, in particular air, a heat-absorbing part of a Peltier element removes thermal energy from the gas of the treatment chamber for condensation of moisture in the gas and a heat-emitting part of the Peltier element supplies thermal energy to the gas in the treatment chamber in order to increase the moisture-absorbing capacity of the gas. Both the heat-absorbing part of the Peltier element and also the heat-emitting part of the Peltier element can thus be used so that on the one hand, less energy is required and on the other hand, the drying performance is improved with lower energy consumption.

The gas preferably flows in a circuit from the heat-absorbing part of the Peltier element to the heat-emitting part of the Peltier element and back again. As a result of this convection of the gas, the gas is advantageously heated at one location and cooled at another location so that the cooling and heating do not negatively influence each other.

In another embodiment, the flow of the gas is free convection, e.g. inside the treatment container or forced convection, in particular caused by a blower. Free convection has the advantage that no blower is required. In the case of forced convection, a higher drying performance can generally be achieved.

In another variant, the flow of the gas, in particular as forced convection, takes place at least partly in an air channel. The flow of the gas in an air channel has the advantage that devices, e.g. heat exchangers can be specifically arranged in the air channel and the air guidance in the treatment chamber takes place predominantly only in one direction because the counterflow takes place outside the treatment chamber.

In an additional embodiment, the heat-absorbing part of the Peltier element removes heat from the gas in the treatment chamber or in the air channel.

The heat-emitting part of the Peltier element preferably supplies heat to the gas in the treatment chamber or in the air channel.

In an additional variant, heat is removed from the gas with the heat-absorbing part and at the same time, heat is supplied to the gas with the heat-emitting part or the heat absorption and emission are preferably carried out in a temporally offset manner using a buffer store. If heat is initially only emitted, the gas to be treated can first be heated, without another heat source advantageously being required because drying takes place effectively at a specific temperature. After switching off the Peltier element and completing the drying, the buffer store cools the crockery so that this is available to the user cooled and dry.

In a household appliance according to the invention, in particular a dishwasher or a washer drier or laundry drier, comprising a treatment chamber filled with gas, in particular air, formed by a container, in particular a washing container for items to be treated, in particular crockery, and a Peltier element having a heat-absorbing part and a heat-emitting part, wherein the heat-absorbing part is arranged in the household appliance in such a manner that thermal energy is withdrawn from the gas of the treatment chamber, a heat-emitting part is also arranged in the household appliance in such a manner that the thermal energy is released to the gas of the treatment chamber.

The heat-absorbing part is preferably arranged in the treatment chamber or in heat-conducting contact with a wall of the container, in particular the washing container. As a result, condensation advantageously takes place in the interior of the washing container so that condensation water can collect in the container.

In another embodiment, the heat-absorbing part is thermally and/or mechanically connected via a contact plate to a wall of the container, in particular a washing container. The heat transmission capacity from the heat-absorbing part to the wall can thereby advantageously be increased or a larger surface to be heated on the wall of the container can be achieved.

In an additional embodiment, in an air channel, preferably with a blower, with an outlet and an inlet to the container, in particular the washing container, the heat-emitting part and/or optionally the heat-absorbing part is arranged in heat-conducting contact with a wall of the air channel or in the air channel or is formed as part of the wall of the air channel. Heat release and optionally heat absorption of the gas in the air channel can thereby be advantageously achieved, i.e. this process takes place specifically outside the container so that the correspondingly thermally treated air can flow specifically into the container.

A heat exchanger is preferably arranged on the heat-emitting part and/or optionally heat-absorbing part for better transmission of heat to the gas in the air channel. The heat exchanger in particular makes it possible to achieve a larger surface between gas and heat exchanger as a result of a lamella-like surface so that the heat transmission capacity is increased.

In a further variant, the heat-absorbing part is arranged in the direction of flow of the gas in the air channel before the heat-emitting part. As a result, the moisture present is initially advantageously reduced by condensation and then the relative humidity is reduced by heating, i.e. the drying capability of the gas or the air is increased.

In an additional variant, a condenser and/or a preferably electrical heater is arranged in the air channel. Moisture can additionally advantageously be removed from the gas by means of the condenser and the relative humidity can be reduced by heating using an electrical heater.

The Peltier element is preferably composed of a plurality of single Peltier elements which are preferably connected in series and/or are preferably semiconductor single Peltier elements.

BRIEF DESCRIPTION OF THE DRAWINGS

The invention is explained hereinafter with reference to drawings as an example. In the figures.

DETAILED DESCRIPTION OF THE EXEMPLARY EMBODIMENTS OF THE PRESENT INVENTION

Figure 1:
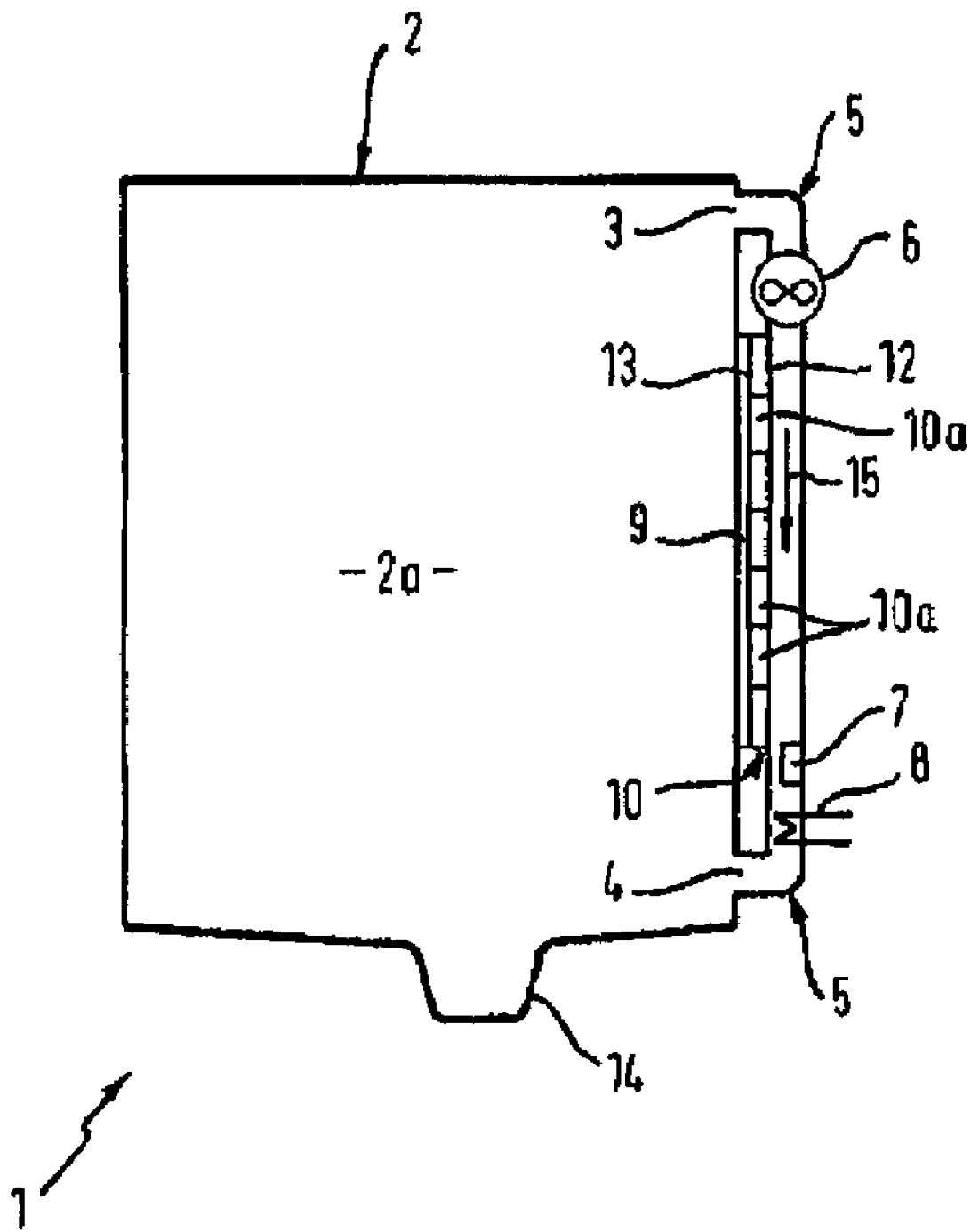
FIG. 1 is a cross-section through a dishwasher according to the invention.

FIG. 1 shows a cross-section through a dishwasher 1 according to the invention with a washing container 2. The washing container 2 encloses a treatment chamber 2a in which crockery baskets with crockery (not shown) are located. The remaining parts of the dishwasher 1 according to the invention are not shown. The washing container 2 has a washing container sump 14. An outlet 3 is located in the upper region of a side wall of the washing container 2 and an inlet 4 is located in the lower region of the side wall of the washing container 2. The outlet 3 and the inlet 4 are interconnected by means of an air channel. The outlet 3 and the inlet 4 can also be arranged at any other location of the washing container 2. A blower 6 and possibly in addition a condenser 7 and a heater 8 are located in the air channel 5. The blower 6 circulates the air of the treatment chamber 2a according to the direction of arrow 15. A reversed direction of circulation is also possible. The air is thus sucked out of the treatment chamber 2a at the outlet 3 and blown into the treatment chamber 2a again in the inlet 4. A Peltier element 10 composed of a plurality of single Peltier elements 10a is arranged between the air channel 5 and a side wall of the washing container 2. The Peltier element 10 is, for example, a metal Peltier element or a semiconductor Peltier element. Peltier elements 10 have the property that when a DC voltage is applied, one side is heated and the other side is cooled, i.e. the Peltier element 10 thus has a heat-emitting part 12 (warm side) and a heat-absorbing part 13 (cold side). The heat-emitting part 12 of the Peltier element 10 is arranged in thermal contact with the air channel 5 and the heat-absorbing part 13 of the Peltier element 10 is formed in heat-conducting contact with the washing container 2. In addition to this arrangement, the heat-absorbing part 13 of the Peltier element 10 can be arranged on any other wall of the washing container 2. A contact plate 9 is preferably arranged between the heat-absorbing part 13 of the Peltier element 10 and the side wall of the washing container 2. The contact plate 9 has a very good heat-conducting capacity. The heat transmitting capacity from the heat-absorbing part 13 to the washing container 2 can thus be improved. If the contact plate 9 is larger than the Peltier element 10, the condensing surface in the washing container 2 can be improved. Optionally, it is also possible to dispense with the contact plate 9.

Figure 2:
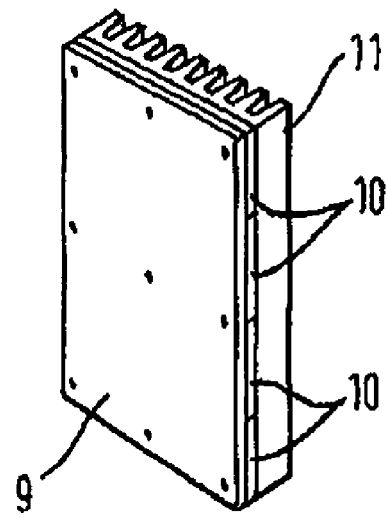
FIG. 2 is a perspective view of a Peltier element with a contact plate and a heat exchanger and FIG. 3 is a perspective view of a washing container in a dishwasher according to the invention.

A heat exchanger 11 can be arranged on the heat-emitting part 12 of the Peltier element 10 (FIG. 2). The heat exchanger 11 has a rib-shaped enlargement of the surface so that the heat exchange between the air from the washing container which is guided through the air channel 5 and the heat exchanger 11 is considerably improved. The heat exchanger 11 is not shown in FIG. 1 but forms a wall of the air channel 5.

In the dishwasher 1 according to the invention, a DC voltage is applied to the Peltier element 10 with the single Peltier elements 10a for drying the crockery (not shown) in a partial program step drying. As a result, the heat-absorbing part 13 is cooled down and the heat-emitting part 12 is heated. The heat-absorbing part 13 absorbs heat from the interior of the treatment chamber 2a via the contact plate 9 and the washing container 2. This means that the washing container 2 is cooled in the area of the applied contact plate 9 and thereby forms a condensing surface for the moisture-saturated air in the treatment chamber 2a. The moisture can thus condense on the washing container 2 in this region and flow off into the washing container sump 14. Forced convection of the air of the treatment chamber 2 is achieved by the blower 6. The air sucked in the outlet 3 is heated in the air channel 5 by the heat exchanger 11 from the heat-emitting part 12 of the Peltier element 10. The relative air humidity of the air in the air channel thus drops and this heated air can again absorb moisture from the crockery after entering into the treatment chamber 2a via the inlet 4, i.e. can dry this. An air flow cycle forced by the blower is thus provided. Thus, a cooled condensing surface is provided in one wall of the washing container 2 on the one hand to remove the moisture from the air by condensation and on the other hand, the moisture-absorbing capacity of the air is increased by heating the air in the air channel 5 so that this can dry the washed items or crockery faster and more efficiently. According to the present invention, both the warm and also the cold side of a Peltier element is thus completely utilised for the drying process. The drying process according to the present invention thus requires significantly less energy because both sides, i.e. both the warm and the cold side of the Peltier element are used for drying and the drying performance is enhanced considerably.

In addition, a condenser 7 which may be provided and a heater 8 can additionally be used in the air channel 5. The condenser 7 additionally removes moisture from the air in the air channel 5 and the heater 8 additionally heats this air. However, the condenser 7 and the heater 8 are generally not necessary. The condenser 7 is normally in thermal contact with the surroundings.

In another embodiment of the present invention, the blower 6 can be dispensed with (not shown). If the blower 6 is dispensed with, there is no forced convection but free convection. In this case, the direction of flow is reversed in contrast to the exemplary embodiment according to FIG. 1. The air flows in the inlet 4 into the air channel 5, where it is heated on the contact plate 9 and again enters into the treatment chamber 2a in the outlet 3. This heated air can again absorb moisture in the treatment chamber 2 and is cooled on the washing container 2 in the area of the contact plate 9, then sinks to the bottom again and enters into the inlet 4 again.

In another embodiment of the present invention, both the heat-emitting part 12 and also the heat-absorbing part 13 are arranged in the air channel 5. The heat-absorbing part 13 is arranged in the direction of flow of the air in the air channel 5 before the heat-emitting part 12 of the Peltier element 10. In this embodiment, forced convection is preferably implemented using a blower 6. The air in the air channel 5 is thus initially cooled, i.e. the moisture in the air condenses, and then the air is heated again and thus blown dry into the treatment chamber 2a. The water of condensation deposited on the heat-absorbing part 13 in the air channel 5 is generally introduced into the interior of the washing container 2, i.e. it reaches the washing container sump 14.

Figure 3:
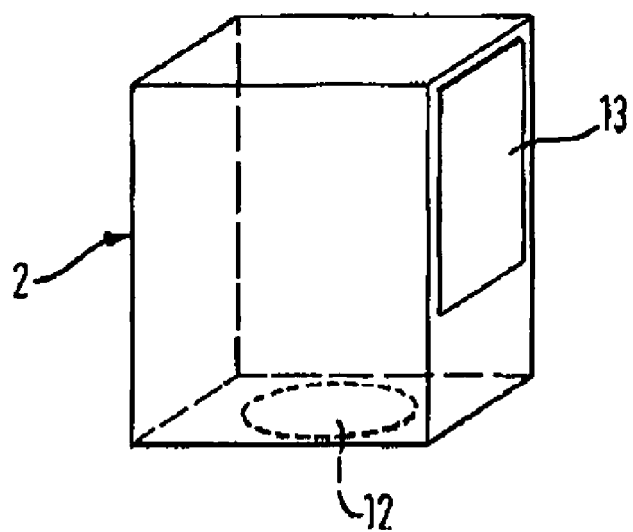

In another embodiment of the present invention (FIG. 3), both the heat-emitting part 12 of the Peltier element 10 and also the heat-absorbing part 13 are arranged in thermal contact with a wall of the washing container 2. The heat-emitting part 12 is preferably located on a bottom wall of the washing container 2 and the heat-absorbing part 13 is located on a side wall of the washing container 2. The temperature difference between the heat-emitting part and the heat-absorbing part results in free convection of the air in the treatment chamber 2a. In general, a contact plate 9 (not shown) is arranged between the washing container 2 and the heat-emitting part 12 or the heat-absorbing part 13. The contact plate 9 has the task of improving the thermal energy exchange between the wall of the washing container 2 and the heat-emitting part 12 or the heat-absorbing part 13, e.g. as a result of the cooled or heated areas in the walls of the washing container 2 being enlarged. In addition, in this exemplary embodiment, the free convection inside the treatment chamber 2a can also be assisted by a blower 6 which can be arranged both inside and also outside the washing container 2 in an air channel (not shown).

In addition to the embodiments so far, in all the exemplary embodiments is possible to attach a buffer store to the heat-emitting part 12 and/or the heat-absorbing part 13 to delay the absorption or emission of thermal energy in time. For example, a buffer store (not shown) can be attached to the heat-absorbing part 13. As a result, when starting up the drying process according to the invention, heat is initially only released from the heat-emitting part 12 to the air of the treatment chamber 2a. The air temperature in the treatment chamber 2a is thereby increased without any cooling by the cold side of the Peltier element 10. After the thermal energy storage capacity in the buffer store has been used up, heat absorption and heat release then take place simultaneously on the heat-emitting part 12 and on the heat-absorbing part 13. When the DC voltage at the Peltier element 10 is switched off, no heat is released on the warm side of the Peltier element 10 but heat is only absorbed via the buffer store on the heat-absorbing part 13 of the Peltier element 10. By this means, on the one hand the crockery in the washing container 2 is cooled in a particularly advantageous manner and on the other hand, condensation takes place so that the user of the dishwasher does not have hot crockery present on immediately opening the door of the washing container after the end of the drying process but the crockery is already cooled and can thus be used again immediately.

When considered in its entirety, the drying method according to the invention for household appliances and the household appliance according to the invention, in particular a dishwasher according to the invention allows both the warm side and the cold side of a Peltier element to be used for drying. By using the warm side, i.e. the heat-emitting part of the Peltier element, the air in the treatment chamber of the household appliance is heated so that the relative humidity of the air drops and thus the moisture-absorbing capacity of the air increases, meaning a better drying performance. It is thus possible to arrange the drying of items to be treated, in particular in dishwashers, rapidly and efficiently with low energy consumption.

The invention claimed is:

1. A drying method for drying items to be treated in a household appliance treatment chamber filled with a fluid in a gas phase, the drying method comprising:
   guiding the gas phase fluid in the household appliance treatment chamber into contact with a heat-absorbing part of a Peltier element for removal of thermal energy from the gas phase fluid by the heat-absorbing part of the Peltier element, thereby resulting in corresponding condensation of moisture in the gas phase fluid; and
   supplying thermal energy to the gas phase fluid in the household appliance treatment chamber via a heat-emitting part of the Peltier element in order to increase the moisture-absorbing capacity of the gas phase fluid in the household appliance treatment chamber,
   the gas phase fluid contacting one of the heat-absorbing part in the household appliance treatment chamber, and a contact plate that is in the treatment chamber and is in thermal contact with the heat-absorbing part.

2. The drying method according to claim 1, wherein the gas flows in a circuit from the heat-absorbing part of the Peltier element to the heat-emitting part of the Peltier element and back again.

3. The drying method according to claim 2, wherein the flow of the gas is free convection by at least one of free convection inside the treatment chamber and forced convection caused by a blower.

4. The drying method according to claim 3, wherein the flow of the gas as forced convection takes place at least partly in an air channel.

5. The drying method according to claim 4, wherein the heat-absorbing part of the Peltier element removes heat from the gas in at least one of the treatment chamber and the air channel.

6. The drying method according to claim 4, wherein the heat-emitting part of the Peltier element supplies heat to the gas in at least one of the treatment chamber and the air channel.

7. The drying method according to claim 1, wherein guiding the gas phase fluid in the household appliance treatment chamber into contact with a heat-absorbing part of a Peltier element and supplying thermal energy to the gas phase fluid in the household appliance treatment chamber via a heat-emitting part of the Peltier element is accomplished via a selected one of removing heat from the gas with the heat-absorbing part of the Peltier element and, at the same time, supplying heat to the gas with the heat-emitting part of the Peltier element and removing heat from the gas with the heat-absorbing part of the Peltier element and supplying heat to the gas with the heat-emitting part of the Peltier element are carried out in a temporally offset manner using a buffer store.

8. A household appliance comprising:
   a washing container subjecting items to a wetting treatment;
   a container forming a treatment chamber subjecting items that have been wetted to a drying treatment, the treatment chamber being filled with a fluid in a gas phase; and
   a Peltier element having a heat-absorbing part and a heat-emitting part, the heat-absorbing part being arranged in the household appliance and withdrawing thermal energy from the gas phase fluid of the treatment chamber, and
   the heat-emitting part being arranged one of in the treatment chamber of the household appliance and in thermal contact with a contact plate in the treatment chamber of the household appliance,
   the heat-emitting part releasing the thermal energy to the gas phase fluid in the treatment chamber.

9. The household appliance according to claim 8, wherein the heat-absorbing part is arranged in a selected one of the treatment chamber and in heat-conducting contact with a wall of the container.

10. The household appliance according to claim 9, wherein the heat-absorbing part is connected at least one of thermally and mechanically via a contact plate to a wall of the container.

11. The household appliance according to claim 8, wherein, in an air channel with an outlet and an inlet to the container at least one of the heat-emitting part and the heat-absorbing part is arranged in at least one of heat-conducting contact with at least one of a wall of the air channel, in the air channel, and formed as part of the wall of the air channel.

12. The household appliance according to claim 11, wherein a heat exchanger is arranged on at least one of the heat-emitting part and the heat-absorbing part for transmission of heat to the gas phase fluid in the air channel.

13. The household appliance according to claim 11, wherein the heat-absorbing part is arranged in a direction of flow of the gas phase fluid in the air channel upstream the heat-emitting part.

14. The household appliance according to claim 11, wherein at least one of a condenser and an electrical heater is arranged in the air channel.

15. The household appliance according to claim 11, wherein the Peltier element includes a plurality of single Peltier elements that are one of connected in series and semiconductor single Peltier elements.

16. The household appliance according to claim 11 comprising:
   means for executing the drying treatment of items in the treatment chamber via guiding the gas phase fluid in the household appliance treatment chamber into contact with the heat-absorbing part of the Peltier element for removal of thermal energy from the gas phase fluid by the heat-absorbing part of the Peltier element, thereby resulting in corresponding condensation of moisture in the gas phase fluid; and supplying thermal energy to the gas phase fluid in the household appliance treatment chamber via the heat-emitting part of the Peltier element in order to increase the moisture-absorbing capacity of the gas phase fluid in the household appliance treatment chamber.

17. The household appliance according to claim 8, wherein the household appliance is one of a dishwasher, a washer drier, and a laundry drier.

18. The household appliance according to claim 11, wherein the air channel includes a blower.

* * * * *